March 1, 1932.                J. M. MITCHELL                1,848,023
                          AUTOMATIC SETTLING TANK
                             Filed July 9, 1931
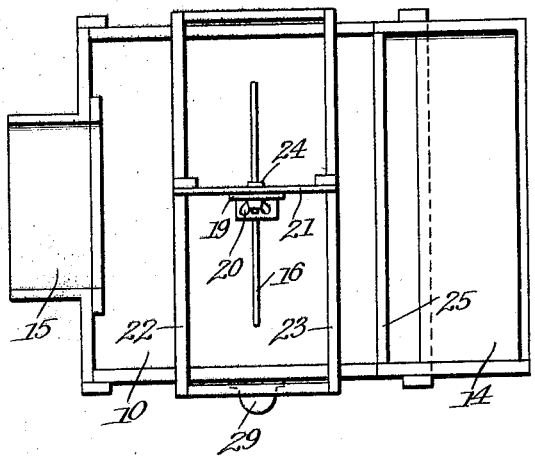
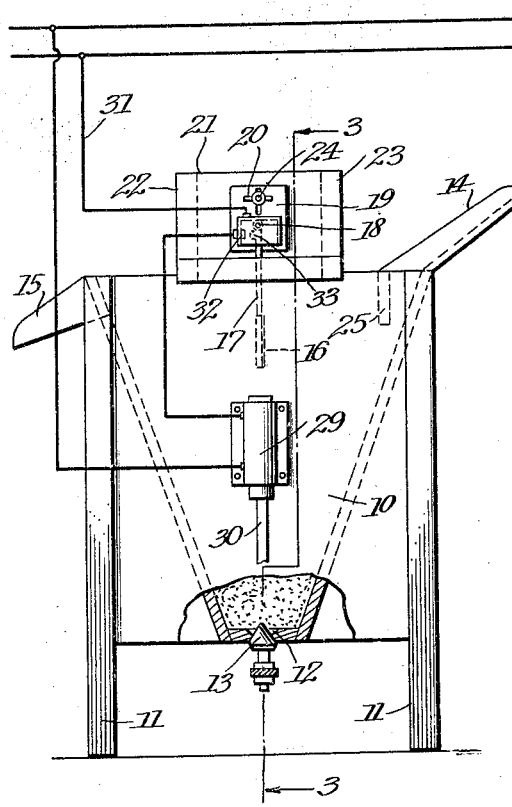
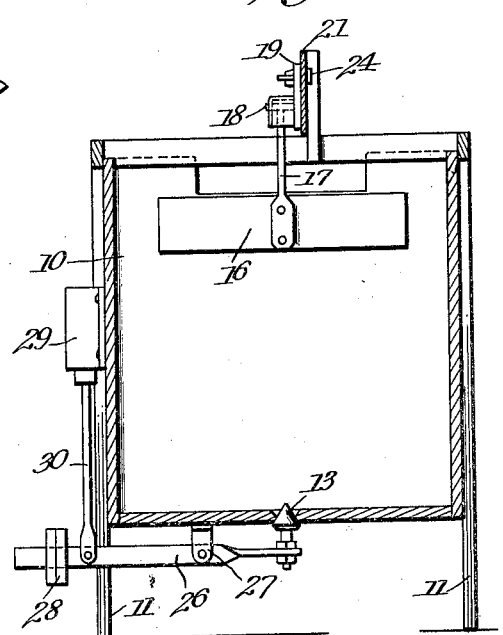
Inventor
J. Macdonald Mitchell
By Edmund H. Parry Jr.
                                                      Attorney.

Patented Mar. 1, 1932

1,848,023

UNITED STATES PATENT OFFICE

JAMES MACDONALD MITCHELL, OF FLUSHING, NEW YORK

AUTOMATIC SETTLING TANK

Application filed July 9, 1931. Serial No. 549,761.

This invention is directed to apparatus for discharging materials held in suspension from liquids. It has particular reference to a structure which operates automatically and continuously to discharge both fine and coarse materials from suspension in liquids.

It has heretofore been contemplated to utilize various types of structure for effecting the automatic discharge of materials from a tank after they have settled. One type of apparatus contemplates mounting the settling tank on a movable and balanced frame so that after a given quantity of materials have settled, their weight will cause the tank to move downwardly to open a valve and thus permit the discharge of the settled materials, the arrangement being such that when the settled materials have been discharged the tank will move upwardly to close the valve. It has also been proposed to regulate the discharge of settled materials from a tank in accordance with variations in level of the liquid in the tank, various means, such as a float, being provided to regulate the valve.

The apparatus of the present invention utilizes a novel means and principle of operation in effecting the discharge of materials from a settling tank, and is deemed to present numerous practical advantages over the prior art structures. The present device is absolutely automatic in operation and operates in a smooth and continuous cycle to cause the discharge of settled materials when the level of the latter reaches any desired point in the tank. The present device is substantially foolproof, comprises relatively few parts, and may be manufactured at a minimum cost.

As long as liquid containing materials to be settled out is introduced from a source of supply, it will be appreciated that there is a circulation or flow of liquid in the tank. When none or substantially a small quantity of materials has settled out of suspension, the liquid from the source will flow downwardly. As the quantity of material settled increases, the level thereof will rise, thus decreasing the volumetric capacity of the tank available for the liquid, with the result that the flow of liquid from the source will be deflected upwardly by the upper surface of the settled material and will be more direct between the supply inlet and the liquid overflow. It is proposed to make use of this change in direction and velocity of the liquid flow at a suitable point in the tank for controlling the discharge of settled material. It can be readily appreciated that the provision of suitable means in a tank responsive to the flow of liquid is well adapted to regulate the discharge of settled materials, inasmuch as such factor is dependent upon variations in level of the materials settled.

To utilize the variations in velocity and direction of flow under changes in level of the settled materials as a means for controlling the discharge valve, I provide a vane or paddle positioned at a suitable height in the tank on a dependent pivoted support. As the level of settled materials rises in the tank, the flow of liquid from the source of supply will be deflected more directly against the side of the paddle until finally the paddle is caused to swing on its support due to the velocity or intensity of the liquid current impinging thereon. To utilize the paddle or vane for controlling the discharge from the tank, suitable connections are made to the discharge valve so that as the paddle swings the discharge valve will be opened. It is within the contemplation of this invention to effect a mechanical arrangement of links and levers between the paddle and the discharge valve but, preferably, in order that the device may be sensitive and quickly responsive as soon as the level of settled materials reaches a predetermined height, it is proposed to utilize an electro-magnet to operate the discharge valve and to cause the paddle to operate a switch in the electrical circuit of the solenoid. After the valve has been opened to effect discharge of materials settled and the level thereof has been materially lowered, the flow of liquid will no longer impinge directly against the paddle and the same will swing back to a substantially vertical position and allow the valve to close.

In the accompanying drawings I have illustrated one form of apparatus possessing the above-described features and characteristics. It will be understood, however, that the detailed features of construction therein shown are not to be taken as limiting the scope of my invention, as the same is capable of a wide range of modification and equivalency without departing from the spirit thereof.

Fig. 1 shows a top plan view of a settling tank embodying my invention;

Fig. 2 is a view in side elevation with portions of the side wall broken away to illustrate the details of construction; and Fig. 3 is a vertical section taken on the line 3—3 of Fig. 2.

Referring now to the drawings, the reference numeral 10 indicates a settling tank which may be of any desired size or shape and be constructed of any suitable material. Suitable supports such as the standards 11 are provided, the same being of any desired height so as to permit materials discharged from the bottom of the tank to be withdrawn. Settled materials are discharged through an opening 12 controlled by a valve 13. Preferably, such valve discharge is located in the bottom of the tank and, as indicated in Fig. 2, the side walls of the tank may be tapered towards the bottom to facilitate the discharge. Any suitable means, such as 14, may be utilized to permit the introduction of liquids carrying materials in suspension into the tank. Of course, if desired, any suitable pipe or conduit may be substituted. To permit the withdrawal of liquid when the level thereof rises towards the top of the tank, an overflow outlet 15 is provided, the same presumably occupying a position substantially above the bottom of the tank, but below the level of the supply intake.

No claim to novelty is made in the structure so far described as the same is well known in the art. The features of my novel discharge control will now be described. Located at a suitable height in the tank is a vane or paddle 16 dependent from a supporting arm 17 which swings on a suitable pivot 18. In order that the position of the paddle or vane may be adjusted, both vertically and horizontally with respect to the tank, the pivot 18 is preferably positioned on a block 19 provided with a cross-shaped slot 20, and adjustably secured to a panel 21 supported above the tank by suitable means such as frame members 22 and 23. A thumb screw 24 may be utilized to permit ready adjustment of the block with respect to the paddle. The frame members may be slidably supported on top of the tank to permit the position of the paddle to be adjusted relative to the intake 14 so that the device will function to best advantage.

The paddle 16 is preferably located relatively near the top of the tank, and is positioned preferably at some distance from and facing the supply inlet 14. The proportions of the paddle and the position thereof will be determined according to the size of the tank, the intensity or rate of flow of the supply through the intake, and the quality of product desired to be settled and discharged.

To prevent undesired movement of the paddle when the level of liquid in the tank is relatively high, but when the level of materials settled has not yet reached a desired height, a shield 25 is provided between the intake and the paddle extending a short distance below the top of the tank. With the arrangement just described, and as indicated in Figure 2, it will be understood that the paddle will occupy a substantially vertical position until the level of material settled rises to a height shortly below the paddle. When the level of settled materials has reached a height such as that indicated in dotted lines in Fig. 2, the flow of liquid caused by the continuous introduction from the source of supply will be deflected against the paddle to swing the same upwardly on its pivoted support in the direction of the overflow 15. After the valve in the bottom of the tank has been opened by mechanism now to be described, the level of the settled materials will, of course, drop and the velocity of flow of liquid will decrease in the region of the paddle and will no longer impinge thereupon. Then the paddle will swing downwardly to substantially the vertical position illustrated.

The discharge valve 13 may be of any desired type and various types of actuating mechanism controlled by the novel arrangement above described may be utilized in connection therewith. Such valve, as illustrated, may be conveniently positioned on an arm 26 fulcrumed on a support 27 and balanced by a counter-weight 28. An electro-magnet 29 acting through a connecting rod 30 may be utilized to actuate the valve. One of the power lines 31 which supplies electricity to the magnet is provided with a circuit breaking switch controlled by the paddle or vane mechanism above described. Such arrangement may conveniently include a contact 32 adapted to engage a contact 33 positioned on the paddle arm and connected with power line 31. With such arrangement as best shown in Figure 2, the contacts will close to complete the circuit for the electro-magnet when the paddle swings upwardly.

The discharge control for a settling tank may be utilized for settling all types of materials, inasmuch as it is entirely non-dependent on the weight of the materials settled but, on the other hand, operates in accordance with the level thereof which causes changes in the direction and velocity of flow of liquid impinging against the vane. The device is relatively sensitive, fully automatic and smooth in operation. It will be understood that the parts may be proportioned and adjusted so that the discharge valve will be actuated when settled materials have risen to any desired height. The arrangement, furthermore, is such that as soon as the level of the settled materials has lowered, the device will operate to quickly close the discharge valve and thus prevent the withdrawal of liquid therethrough.

I claim:

1. In a settling tank for separating heavier materials from liquids, a discharge for settled materials, and controlling means for said discharge, said means being responsive to variations in flow of liquid in the tank under changes in level of materials settled.

2. In a settling tank for separating heavier materials from liquids, a discharge for settled materials, and controlling means for said discharge, said means including a vane responsive to variations in flow of liquid in the tank under changes in level of materials settled.

3. In a settling tank for separating heavier materials from liquids, a discharge for settled materials, and means immersed in the tank and being responsive to variations in the intensity of flow of surrounding liquid under changes in level of materials settled for controlling said discharge.

4. In a settling tank for separating heavier materials from liquids, a discharge for settled materials, and means responsive to variations in the direction of flow of liquid in the tank under changes in level of materials settled for controlling said discharge.

5. In a settling tank for separating heavier materials from liquids, a discharge for settled materials, a supply inlet, and discharge controlling means, said means including a vane occupying a location in the tank out of line with the normal direction of flow through the inlet and being responsive to variations in the direction of flow under changes in level of materials settled to actuate said discharge.

6. In a settling tank for separating heavier materials from liquids, a discharge for settled materials, a supply inlet, an overflow outlet, said inlet or outlet being located substantially above the bottom of the tank, and discharge controlling means including a vane immersed in the tank and being operative as the direction of flow of liquid between the inlet and outlet becomes more direct upon rise in level of materials settled.

7. In a settling tank for separating heavier materials from liquids, a discharge for settled materials, a supply inlet, an overflow outlet, said inlet or outlet being located substantially above the bottom of the tank, and discharge controlling means including a vane immersed in the tank and being operative in accordance with variations in path of flow of liquid between the inlet and outlet under changes in level of materials settled.

8. In a settling tank for separating heavier materials from liquids, a discharge for settled materials, a supply inlet, an overflow outlet, said inlet or outlet being located substantially above the bottom of the tank, and discharge controlling means including a vane immersed in the tank and being operative as the displacement of materials settling increases to cause a more direct flow of liquid between the inlet and overflow.

9. In a settling tank for separating heavier materials from liquids, a discharge for settled materials, a supply inlet, an overflow outlet, and discharge controlling means including a vane located in the tank between the inlet and outlet and being responsive to variations in the intensity of flow of liquid between the inlet and outlet.

10. In a settling tank for separating heavier materials from liquids, a discharge for settled materials, a supply inlet, an overflow outlet, said inlet and outlet being located substantially above the bottom of the tank, and discharge controlling means including a vane located in the tank between the inlet and outlet and being operative as the path of flow of liquid between the inlet and outlet becomes more direct to open the discharge.

11. In a settling tank for separating heavier materials from liquids, a discharge for settled materials, a supply inlet, and a vane pivotally supported in the tank and being operative in accordance with variations in the direction of flow of liquid in the tank under changes in level of materials settled for controlling said discharge.

12. In a settling tank for separating heavier materials from liquids, a discharge for settled materials, a supply inlet, and a vane pivotally supported in the tank subject to immersion therein and being responsive to variations in the intensity of movement of the surrounding liquid to actuate said discharge.

13. In a settling tank for separating heavier materials from liquids, a discharge for settled materials, a supply inlet, an overflow outlet, said inlet and outlet being located in spaced relation, and a vane pivotally supported in the tank between the inlet and outlet and being responsive to variations in the flow of liquid therebetween to actuate the discharge.

14. In a settling tank for separating heavier materials from liquids, a discharge for settled materials, a supply inlet, and a vane pivotally supported in the tank and responsive to variations in flow of liquid in the tank under changes in level of materials settled, said vane being adjustably mounted.

15. In a settling tank for separating heavier materials from liquids, a discharge for settled materials, a supply inlet, and a vane pivotally supported in the tank and responsive to variations in flow of liquid in the tank under changes in level of materials settled, said vane being mounted for adjustment longitudinally of the tank.

16. In a settling tank for separating heavier materials from liquids, a discharge for settled materials, a supply inlet, an overflow outlet, said inlet and outlet being located in spaced relation horizontally of the tank, and discharge controlling means including a vane pivotally supported in the tank between the inlet and outlet and being responsive to variations in flow of liquid therebetween, said vane being mounted for adjustment horizontally of the tank.

17. In a settling tank for separating heavier materials from liquids, a discharge for settled materials, a supply intake, and a vane of substantial width and small depth pivotally suspended in the tank, said vane being responsive to variations in the flow of liquid in the tank under changes in level of materials settled to actuate the discharge.

18. In a settling tank for separating heavier materials from liquids, a discharge for settled materials, a valve controlling said discharge, a supply intake, an electro-magnetic valve actuating means including an electrical circuit, a switch in said circuit, and means responsive to variations in flow of liquid in the tank under changes in level of materials settled for operating said switch.

In testimony whereof, I affix my signature.

JAMES MACDONALD MITCHELL.